United States Patent [19]

Hagen et al.

[11] 3,882,141
[45] May 6, 1975

[54] BENZO-(F)-1,4-THIAZEPINES
[75] Inventors: Helmut Hagen, Frankenthal; August Amann, Ludwigshafen; Hubert Giertz, Limburgerhof, all of Germany
[73] Assignee: Badische Anilin- & Soda-Fabrik Aktiengesellschaft, Ludwigshafen, Rhein, Germany
[22] Filed: Mar. 27, 1973
[21] Appl. No.: 345,308

[30] Foreign Application Priority Data
Mar. 30, 1972 Germany............................ 2215606

[52] U.S. Cl. .......... 260/309.6; 260/309.7; 424/273
[51] Int. Cl............................................ C07d 49/34
[58] Field of Search.................................. 260/309.6

[56] References Cited
OTHER PUBLICATIONS
Chem. Abst., Eighth Collective Index Vol. 66–75, 1967–1971, Subjects Glucope–Indena, pp. 15552S & 15652S (1973).
Derieg et al., Chem. Abst., Vol. 73, No. 25542y (1970).
Gittos et al., Chem. Abst., Vol. 72, No. 12601w (1970).
Griot, Chem. Abst., Vol. 65, Columns 20154–20155 (1966).

*Primary Examiner*—Natalie Trousof
*Attorney, Agent, or Firm*—Johnston, Keil, Thompson & Shurtleff

[57] ABSTRACT

Biologically active imidazolino-[1,2-d]-benzo-1,4-thiazepines, their production and their acid addition salts. These compounds, especially as the pharmacologically compatible salts, are useful to dilate coronary vessels of guinea pigs and rabbits and exhibit analgesic, spasmolytic and blood pressure changing properties.

6 Claims, No Drawings

BENZO-(F)-1,4-THIAZEPINES

The invention relates to novel benzo-[f]-1,4-thiazepines of the formula (I):

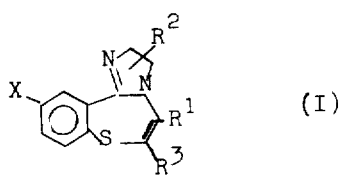
(I)

and their acid addition salts,
in which
X is hydrogen, chloro, bromo or lower alkyl of one to seven carbon atoms, R¹ is lower alkyl of one to four carbon atoms or an unsubstituted or substituted mononuclear or dinuclear carbocyclic aromatic radical and R² and R³ are each hydrogen or lower alkyl of one to four carbon atoms.

Examples of lower alkyls of one to seven carbon atoms for X are: methyl, ethyl, propyl, isopropyl, butyl, tert.-butyl and amyl. Suitable mononuclear or binuclear carbocyclic aromatic radicals include phenyl or naphthyl which may bear chloro, bromo, nitro, hydroxy, methoxy, lower alkyl, fluoro, iodo or acrylamino as substituents. Lower alkyl of one to four carbon atoms for R² and R³ may be methyl, ethyl, propyl, isopropyl or butyl.

The novel benzothiazepines of formula (I) may be prepared by reacting a compound of the general formula (II) whose structure may be represented in two forms:

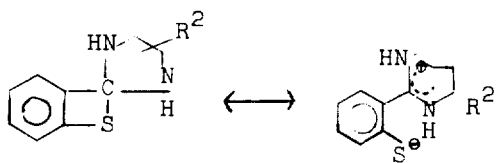

in which X and R² have the meanings given above with a compound of the general formula (III):

(III)

in which R¹ and R³ have the meanings given above and Y is halogen and cyclizing the intermediate product of the formula (IV):

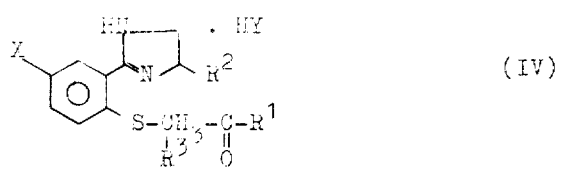
(IV)

Preferred halogens for Y are chlorine and bromine.

The starting compounds of the formula (II) may be prepared for example by the process of German Laid-Open Specification DOS No. 2,034,987 by reacting an o-halobenzaldehyde compound or a derivative of the same with an ethylenediamine and elementary sulfur; these starting materials may be substituted with X and R² as defined in Formula (I).

This reaction may be represented as follows when o-chlorobenzaldehyde and ethylenediamine are used:

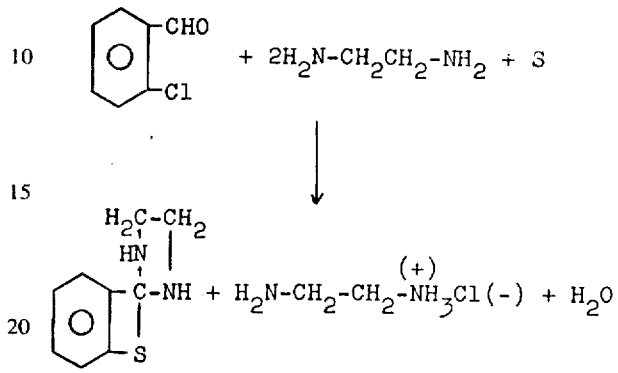

and by the following formulae when o-chlorobenzal chloride, as derivative of an o-halobenzaldehyde, ethylenediamine and elementary sulfur are reacted:

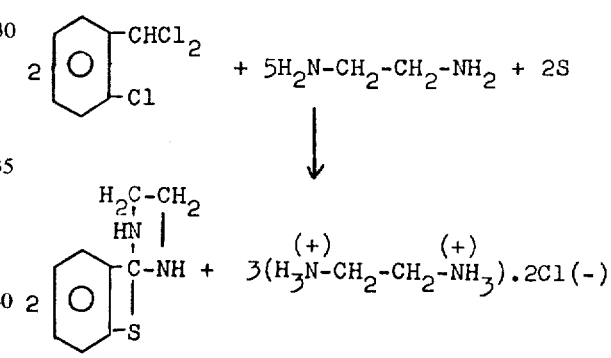

The o-halobenzaldehyde compound or its benzal derivative is as a rule reacted with the ethylenediamine and elementary sulfur in stoichiometric amount. Ethylenediamine and/or sulfur may however be used in excess, for example up to twice the amount of the stoichiometric ratio with reference to o-halobenzaldehyde compound or the derivative thereof.

The reaction is carried out as a rule at a temperature of 60° to 180°C, preferably from 100° to 140°C, at atmospheric or superatmospheric pressure, continuously or batchwise. It is advantageous to use organic solvents which are inert under the reaction conditions, for example aromatic hydrocarbons such as benzene or toluene; alkanols such as methanol, ethanol, propanol or a butanol; glycol ethers such as glycol monomethyl ether or glycol monoethyl ether; or suitable mixtures. A ratio of from 5 to 20 moles of solvent per mole of o-halobenzaldehyde compound or its derivative is preferred.

The reaction may be carried out as follows: o-halobenzaldehyde compound or its benzal derivative and ethylenediamine with or without a solvent, are heated to the reaction temperature and then elementary sulfur is added. The mixture is allowed to react for another ten to fifteen hours at the reaction temperature. The end product is separated by a conventional method, for example by crystallization and filtration of the mixture. The diaminoalkane hydrohalide formed is removed by washing with water. The end product may be purified by recrystallization if necessary.

Preferred starting materials of the formula (III) are chloromethyl or bromomethyl ketones such as chloroacetone, phenacyl chloride, substituted phenacyl chlorides, phenacyl bromide, substituted phenacyl bromides and β-chloromethylnaphthyl ketone.

Reaction into compounds (IV) may conveniently be carried out in a solvent, for example a lower alcohol of one to four carbon atoms such as methanol, ethanol, propanol, isopropanol or isobutanol, or glycol, glycol monomethyl ether or cyclic ethers such as dioxane at temperatures of from 20° to 100°C, advantageously in the presence of a base. The preferred temperature range is from 50° to 70°C. The preferred solvent is methanol. Alkoxides of the alcohols used as solvent, particularly sodium methylate, potassium methylate and tertiary amines such as triethylamine or pyridine have proved to be advantageous as bases.

Cyclization of the compounds (IV) into the benzothiazepines of the invention is carried out by eliminating water and this may be done in various ways, for example thermally or by means of agents which effect elimination of water.

For example the cyclization may be carried out by heating in a solvent which boils above 100°C. Higher alcohols such as isobutanol or glycol monomethyl ether have proved to be particularly suitable as solvents. A temperature range of from 100° to 160°C is advantageous for the cyclization.

Cyclization and elimination of water may also be carried out in the presence of bases such as sodium methylate, potassium methylate, or a tertiary amine, for example triethylamine or pyridine, followed by heating in a solvent which boils at about 100°C. In this method xylene, toluene and n-butanol are for example advantageous as solvents.

Cyclization may also be carried out in the presence of conventional acid water-eliminating agents such as thionyl chloride, phosphorus pentachloride or a polyphosphoric acid. This method has the advantage that the reaction may be carried out at lower temperatures, for example within the range from 40° to 80°C. Benzene, toluene or chloroform may be used as solvents in this case.

The benzothiazepines of formula (I) may be obtained in a particularly preferred embodiment from the starting compounds of formulae (II) and (III) without isolating the compound (IV) by reacting them directly in a solvent which boils at above 100°C. Convenient solvents for this purpose are glycol monomethyl ether, glycol monoethyl ether, n-butanol and isobutanol. The salt corresponding to the halogen Y in formula (III) is thus obtained.

When for example imidazolino-[1,2-d]-benzo-[f]-3-phenyl-1,4-thiazepine is prepared, the synthesis of a compound of the formula (I) may be represented by the following equations:

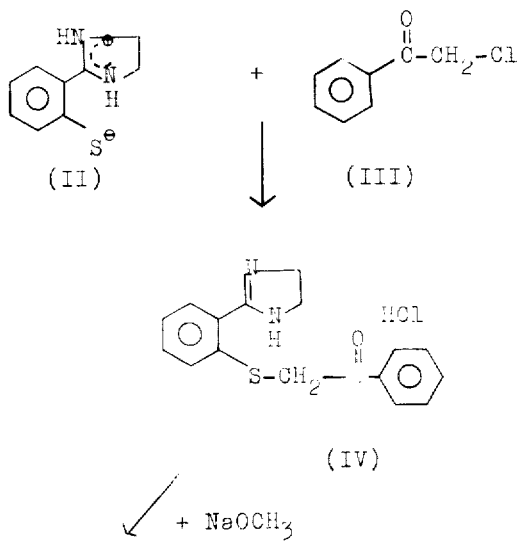

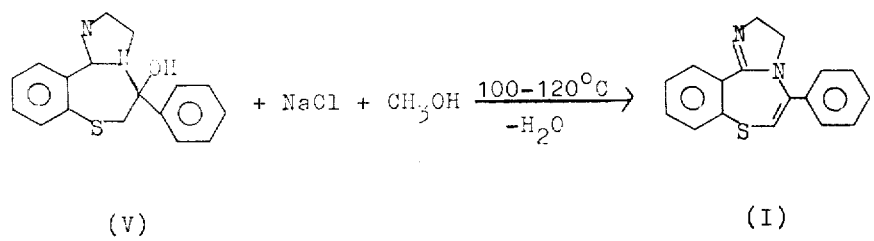

Preferred substituents for the new benzothiazepines are: for X: hydrogen, chloro, bromo, methyl, ethyl and propyl; for R¹: methyl, ethyl, propyl and butyl;

as aryl radicals: phenyl and naphthyl which may bear halogen such as chloro, bromo, fluoro or iodo, or nitro, hydroxy, methoxy, acetylamino or lower alkyl, particularly methyl, as substituents;

for R²: hydrogen, methyl, ethyl or propyl; for R³: hydrogen or methyl.

The following are examples of benzothiazepines of the invention: for benzothiazepines in which R¹ is aryl and each of X, R² and R³ is hydrogen:
imidazolino-[1,2-d]-benzo-[f]-3-phenyl-1,4-thiazepine and the corresponding 3-(4-chlorophenyl), 3-(4-methoxyphenyl), 3-(4-nitrophenyl), 3-(4-bromophenyl), 3-(4-methylphenyl) and 3-(2,4-dimethylphenyl) compounds or imidazolino-[1,2-d]-benzo-[f]-3-(β-naphthyl)-1,4-thiazepine; for benzothiazepines which bear a substituent for X in the aromatic ring: imidazolino-[1,2-d]-4'-chlorobenzo-[f]-3-methyl-1,4-thiazepine and the corresponding 3-ethyl, 3-butyl, 3-phenyl, 3-(4-chlorophenyl), 3-(4-nitrophenyl) and 3-(4-bromophenyl) compounds or imidazolino-[1,2-d]-4'-bromobenzo-[f]-3-methyl-1,4-thiazepine, imidazolino-[1,2-d]-4'-methylbenzo-[f]-3-methyl-1,4-thiazepine, or imidazolino-[1,2-d]-4'-propylbenzo-[f]-3-methyl-1,4-thiazepine.

The following may also be mentioned: 4-(5)-methylimidazolino-[1,2-d]-benzo-[f]-3-(2,4-dichlorophenyl)-1,4-thiazepine hydrochloride, the corresponding 3-(2,4-dimethylphenyl) compound, 4-(5)-methylimidazolino-[1,2-d]-benzo-[f]-3-(4-methoxyphenyl)-1,4-thiazepine hydrochloride and the corresponding 4-(5)-ethylimidazolino and 4-(5)-propylimidazolino compounds, 4-(5)-methylimidazolino-[1,2-d]-benzo-[f]-3-(4-methylphenyl)-1,4-thiazepine hydrochloride, the corresponding 3-(4-nitrophenyl) compound or imidazolino-[1,2-d]-benzo-[f]-2-methyl-3-(4-methoxyphenyl)-1,4-thiazepine; imidazolino-[1,2-d]-benzo-[f]-3-(4-acetylaminophenyl)-1,4-thiazepine and the corresponding 3-(4-fluorophenyl) and 3-(4-iodophenyl) compounds and imidazolino-[1,2-d]-4'-chlorobenzo-[f]-3(4-acetylaminophenyl)-1,4-thiazepine and the corresponding 3-(4-fluorophenyl) and 3-(4-iodophenyl) compounds.

The compounds of this invention may be converted by conventional methods into their pharmacologically compatible acid addition salts of organic or inorganic acids. Suitable acids are for example hydrochloric acid, hydrobromic acid, sulfuric acid, acetic acid, oxalic acid, maleic acid, lactic acid and tartaric acid.

Formulations containing the new compounds as active ingredients may be obtained according to the desired route of administration by methods known to those skilled in the art.

The new benzothiazepines have valuable pharmacological properties. They exert, particularly in the form of their pharmacologically compatible salts such as the hydrochlorides or acetates, a prolonged dilating effect on the coronary vessels of guinea pigs and rabbits. Moreover they have analgesic, spasmolytic and blood pressure changing properties. Some affect the central nervous system. They are capable of reducing spontaneous motility in mice and of neutralizing eyelid paralysis after Serpasil and tetrabenazine.

Moreover some derivatives are effective against bacteria and fungi.

The dilating effect on coronary vessels has been established in guinea pigs and rabbits by the methods of Langendorff (Pflugers Arch. 61, (1895), 219) and Uhlmann, Nobile (Naunyn-Schmiedebergs Arch. Pharmakol. Exp. Pathol., 192 (1939), 189).

The toxicity and coronary dilating effect of some of the substances of the formula:

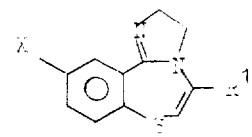

are indicated in the following Table:

Flow increase = flow increase in isolated guinea pig hearts in %:

1γ/ml

| X | R¹ | Toxicity mg/kg p.o. | i.p. | Flow increase |
|---|---|---|---|---|
| -H | -⟨phenyl⟩ | approx. 200 | approx. 75 | 78 |
| -H | -⟨phenyl⟩-OCH₃ | > 200 " | 150 | 94 |
| -H | -⟨phenyl⟩- Cl | > 200 " | 200 | 94 |
| -Cl | -CH₃ | " | 150 " | 50 | 68 |
| -Cl | -⟨phenyl⟩ | > 200 " | 150 | 150 |
| -Cl | -⟨phenyl⟩-Cl | > | > 200 | 71 |

The following compounds are referred to because of their biological effectiveness:

imidazolino-[1,2-d]-4'-chlorobenzo-[f]-3-(4-methoxyphenyl)-1,4-thiazepine acetate;
imidazolino-[1,2-d]-4'-chlorobenzo-[f]-3-(4-nitrophenyl)-1,4-thiazepine acetate;
imidazolino-[1,2-d]-benzo-[f]-3-(2,4-dimethylphenyl)-1,4-thiazepine acetate; imidazolino-[1,2d]-4'-chlorobenzo-[f]-3-(4-methylphenyl)-1,4-thiazepine acetate;
imidazolino-[1,2-d]-benzo-[f]-3-(2-hydroxy-5-methoxyphenyl)-1,4-thiazepine acetate;
imidazolino-[1,2-d]-benzo-[f]-3-(2,5-dimethylphenyl)-1,4-thiazepine acetate;
imidazolino-[1,2d]-benzo-[f]-3-(4-iodophenyl)-1,4-thiazepine acetate and the following compounds in which
R = 4-(5)-methylimidazolino-[1,2d]-benzo-[f]-:
R-3-(4-iodophenyl)-1,4-thiazepine hydrochloride;
R-3-(2,4-dichlorophenyl)-1,4-thiazepine hydrochloride;
R-3-phenyl-1,4-thiazepine hydrochloride;
R-3-(4-methoxyphenyl)-1,4-thiazepine hydrochloride;
R-3-(2,4-dimethylphenyl)-1,4-thiazepine hydrochloride;
R-3-(4-methylphenyl)-1,4-thiazepine hydrochloride;
R-3-(3,4-dimethylphenyl)-1,4-thiazepine hydrochloride;
R-3-(4-nitrophenyl)-1,4-thiazepine hydrochloride; and
R-3-(2-hydroxy-4-methoxyphenyl)-1,4-thiazepine hydrochloride.

The following Examples illustrate the invention although the invention is not limited thereto. The parts given in the Examples are parts by weight.

EXAMPLE 1

Imidazolino-[1,2d]-benzo-[f]-3-phenyl-1,4-thiazepine:

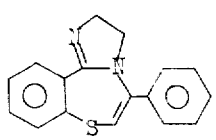

178 parts of benzothietane-2-spiro-2'-imidazolidine is reacted with 154.5 parts of phenacyl chloride in 1,500 parts of methanol. The reaction mixture is stirred for three hours at 60°C and 54 parts of sodium methylate is added in the form of a 30% by weight solution in methanol. The reaction mixture is stirred for another hour at 60°C, concentrated to one third of its volume, cooled and suction filtered. The crystals are washed with 200 parts of water until devoid of chlorine ions, added to 800 parts of xylene and heated for 2 hours at 120°C. The mixture is cooled and the crystals are suction filtered and recrystallized from methanol. The yield is 216 parts, i.e., 78% of theory, and the melting point is 213°C.

EXAMPLE 2

Imidazolino-[1,2-d]-benzo-[f]-3-(4-chlorophenyl)-1,4-thiazepine:

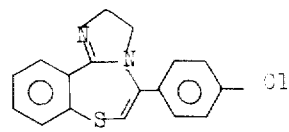

59 parts of benzothietane-2-spiro-2'-imidazolidine is reacted with 63 parts of p-chlorophenacyl chloride in 600 parts of methanol. The reaction mixture is stirred for three hours at 60°C and then 18.5 parts of sodium methylate is added. The reaction mixture is stirred for another hour at 60°C, cooled and suction filtered. The crystals are washed with 100 parts of water to free them from chlorine ions, added to 400 parts of xylene and heated for 2 hours at 120°C. The mixture is cooled and the deposited crystals are suction filtered. The yield is 85 parts which is 82% of theory and the melting point is 191°C.

EXAMPLE 3

Imidazolino-[1,2-d]-benzo-[f]-3-(4-methoxyphenyl)-1,4-thiazepine:

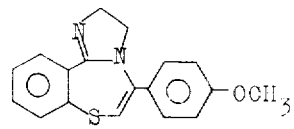

35.6 parts of benzothietane-2-spiro-2'-imidazolidine is reacted with 36.9 parts of p-methoxyphenacyl chloride in 400 parts of methanol. The reaction mixture is stirred for three hours at 60°C, then 11 parts of sodium methylate is added and the whole is stirred for another 2 hours at 60°C, cooled and suction filtered. The crystals obtained are recrystallized from n-butanol. The yield is 49 parts which is 80% of theory and the melting point is 200°C.

EXAMPLE 4

Imidazolino-[1,2-d]-benzo-[f]-3-(4-nitrophenyl)-1,4-thiazepine:

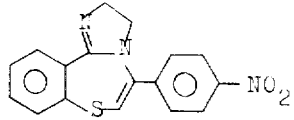

44.5 parts of benzothietane-2-spiro-2'-imidazolidine is reacted with 50 parts of p-nitrophenacyl chloride in 400 parts of methanol. The reaction mixture is stirred for 3 hours at 60°C, then 14 parts of sodium methylate is added and stirring is continued for another 2 hours at 60°C, cooled and suction filtered. The crystals are washed free from chlorine ions with 200 parts of water

EXAMPLE 5

Imidazolino-[1,2-d]-benzo-[f]-3-(4-bromophenyl)-1,4-thiazepine:

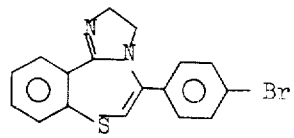

35.6 parts of benzothietane-2-spiro-2'-imidazolidine is reacted with p-bromophenacyl chloride in 500 parts of methanol. The reaction mixture is stirred for another 3 hours at 60°C, then 11 parts of sodium methylate is added, and the whole stirred at 60°C for another two hours, cooled and suction filtered. The crystals are washed free from chlorine ions with 200 parts of water, heated in 400 parts of xylene at 120°C for 2 hours, cooled and suction filtered. The yield is 61 parts which is 85% of theory and the melting point is 198°C.

EXAMPLE 6

Imidazolino-[1,2-d]-benzo-[f]-3-β-naphthyl-1,4-thiazepine:

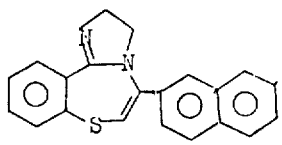

44.4 parts of benzothietane-2-spiro-2'-imidazolidine is reacted with 51.1 parts of β-naphthyl chloromethyl ketone in 600 parts of methanol. The reaction mixture is stirred at 60°C for 3 hours, 14 parts of sodium methylate is added, and the whole is stirred at 60°C for another hour, cooled and suction filtered. The crystals are washed free from chlorine ions with 200 parts of water, heated in 500 parts of xylene for two hours at 120°C, cooled and suction filtered. The yield is 60 parts, i.e., 73% of theory, and the melting point is 208°C.

EXAMPLE 7

Imidazolino-[1,2-d]-benzo-[f]-3-(4-methylphenyl)-1,4-thiazepine:

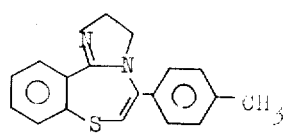

35.6 parts of benzothietane-2-spiro-2'-imidazolidine is reacted with 33.7 parts of p-methylphenacyl chloride in 500 parts of methanol. The reaction mixture is stirred for 3 hours at 60°C, 11 parts of sodium methylate is added, and the whole is stirred for another hour at 60°C, cooled and suction filtered. The crystals are washed free from chlorine ions with 200 parts of water, heated for 2 hours in xylene at 120°C, cooled and suction filtered. The yield is 45 parts (77% of theory) and the meltint point is 238°C after recrystallization from methanol.

EXAMPLE 8

Imidazolino-[1,2-d]-benzo-[f]-3-(2,4-dimethylphenyl)-1,4-thiazepine:

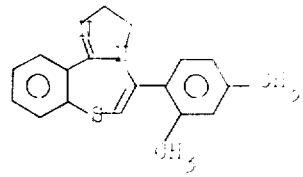

35.6 parts of benzothietane-2-spiro-2'-imidazolidine is reacted with 36.5 parts of 2,4-dimethylphenacyl chloride in 500 parts of methanol. The reaction mixture is stirred for 3 hours at 60°C, 11 parts of sodium methylate is added, the whole concentrated, cooled, suction filtered and washed free from chlorine ions with 200 parts of water, heated in 500 parts of xylene for 2 hours at 120°C, cooled and suction filtered. The yield is 43 parts, i.e. 70% of theory, and the melting point is 188°C.

EXAMPLE 9

Imidazolino-[1,2-d]-4'-chlorobenzo-[f]-3-methyl-1,4-thiazepine:

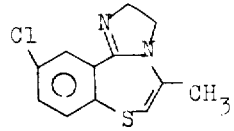

57 parts of 4-chlorobenzothietane-2-spiro-2'-imidazolidine is reacted in 400 parts of methanol with 23.1 parts of chloroacetane. The reaction mixture is stirred for three hours at 60°C, 14 parts of sodium methylate is added and the whole is stirred for another 1 hours at 60°C, cooled, concentrated and suction filtered. The solid is washed with 100 parts of water, heated in 200 parts of toluene for 2 hours at 110°C, cooled and suction filtered. The yield is 41 parts, i.e. 66% of theory, and the melting point is 218° to 220°C.

EXAMPLE 10

Imidazolino-[1,2-d]-4'-chlorobenzo-[f]-3-phenyl-1,4-thiazepine:

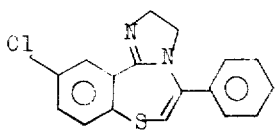

21.3 parts of 4-chlorobenzothietane-2-spiro-2'-imidazolidine is reacted with 15.5 parts of phenacyl chloride in 200 parts of methanol. The reaction mixture is stirred for 3 hours at 60°C, 5.5 parts of sodium methylate is added, and the whole is stirred for another 2 hours at 60°C, cooled and suction filtered. The crystals are washed with 100 parts of water and heated with 200 parts of n-butanol for 1 hour at 100°C. The solution is cooled and the crystals obtained are suction filtered. The yield is 25 parts, i.e. 80% of theory, and the melting point is 155°C with decomposition.

EXAMPLE 11

Imidazolino-[1,2-d]-4'-chlorobenzo-[f]-3-(p-chlorophenyl)-1,4-thiazepine:

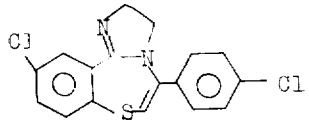

70.8 parts of 4-chlorobenzothietane-2-spiro-2'-imidazolidine is reacted in 600 parts of methanol with 63 parts of p-chlorophenacyl chloride. The reaction mixture is stirred for 3 hours at 60°C, 18.5 parts of sodium methylate is added, and the whole stirred for another two hours at 60°C, cooled and suction filtered. The crystals are washed with water, heated for two hours at 110°C in 400 parts of toluene, cooled and suction filtered. The yield is 81 parts (70% of theory), melting point 202°C.

EXAMPLE 12

Imidazolino-[1,2-d]-4'-chlorobenzo-[f]-3-(4-nitrophenyl)-thiazepine:

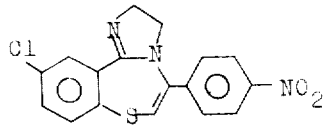

53.1 parts of 4-chlorobenzothietane-2-spiro-2'-imidazolidine is reacted with 50 parts of p-nitrophenyl chloride in 400 parts of methanol. The reaction mixture is stirred for three hours at 60°C, 14 parts of sodium methylate is added, and the whole is stirred for another 2 hours at 60°C, cooled and suction filtered. The crystals are washed with 100 parts of water, heated for two hours in 200 parts of n-butanol at 110°C, cooled and suction filtered. The yield is 66 parts (74% of theory) and the melting point is 215°C.

EXAMPLE 13

Imidazolino-[1,2-d]-4'-chlorobenzo-[f]-3-(p-bromophenyl)-1,4-thiazepine:

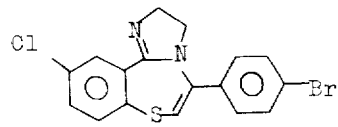

21.3 parts of 4-chlorobenzothietane-2-spiro-2'-imidazolidine is reacted with 23.4 parts of p-bromophenacyl chloride in 400 parts of methanol. The reaction mixture is stirred for 3 hours at 60°C, 5.5 parts of sodium methylate is added, and the whole is stirred for another 2 hours at 60°C, cooled and suction filtered. The solid is washed with water, heated in 200 parts of toluene for 2 hours at 110°C, cooled and suction filtered. The yield is 28 parts, i.e. 71% of theory, and the melting point is 208°C.

EXAMPLE 14

4-(5)-methylimidazolino-[1,2-d]-benzo-[f]-3-(2,4-dichlorophenyl)-1,4-thiazepine hydrochloride:

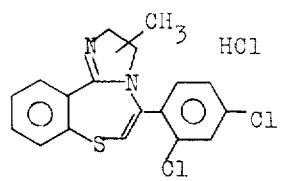

19.2 parts of benzothietane-2-spiro-2'-[4'-(5')-methylimidazolidine] is reacted in 300 parts of glycol monomethyl ether with 22.4 parts of 2,4-dichlorophenyl chloride. The reaction mixture is stirred for 2 hours at 110° to 120°C, cooled, concentrated and 600 parts of ethyl acetate is added to cause crystallization. After about two days the precipitated crystals are suction filtered. The yield is 28 parts, i.e., 70% of theory. The melting point is 310° to 314°C.

EXAMPLE 15

4-(5)-methylimidazolino-[1,2-d]-benzo-[f]-3-(4-methoxyphenyl)-1,4-thiazepine hydrochloride:

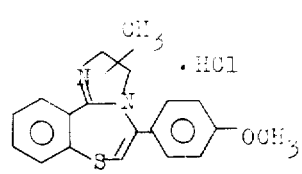

19.2 parts of benzothietane-2-spiro-2'-[4'-(5')-methylimidazolidine] is reacted in 300 parts of glycol monomethyl ether with 18.5 parts of p-methoxyphenacyl chloride. The reaction mixture is stirred for 2 hours at 110° to 120°C, cooled, concentrated, mixed with 500 parts of ethyl acetate and suction filtered 2 days later. The yield is 20 parts, i.e., 56% of theory, and the melting poing is 298° to 304°C.

EXAMPLE 16

4-(5)-methylimidazolino-[1,2-d]-benzo-[f]-3-(4-methylphenyl)-1,4-thiazepine hydrochloride:

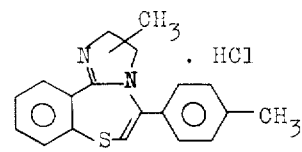

19.2 parts of benzothietane-2-spiro-2'-[4'-(5')-methylimidazolidine] is reacted with 16.9 parts of p-methylphenacyl chloride in 300 parts of glycol monomethyl ether. The reaction mixture is stirred for 3 hours at 110° to 120°C, concentrated, cooled, caused to crystallize by adding a little acetone and suction filtered. The yield is 27 parts, i.e., 79% of theory and the melting point is 315° to 329°C.

EXAMPLE 17

4-(5)-methylimidazolino-[1,2-d]-benzo-[f]-3-(3,4-dimethylphenyl)-1,4-thiazepine hydrochloride:

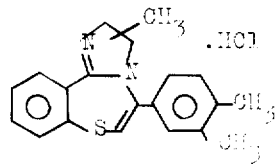

38.4 parts of benzothietane-2'-[4'-(5')-methylimidazolidine] is reacted in 400 parts of glycol monomethyl ether with 36.5 parts of 3,4-dimethylphenacyl chloride. The reaction mixture is stirred for 3 hours at 110° to 120°C, cooled, concentrated and 800 parts of acetone is added. The crystals formed are suction filtered. The yield is 58 parts, i.e., 81% of theory, and the melting point is 281° to 284°C.

EXAMPLE 18

4-(5)-methylimidazolino-[1,2-d]-benzo-[f]-3-(4-nitrophenyl)-1,4-thiazepine hydrochloride:

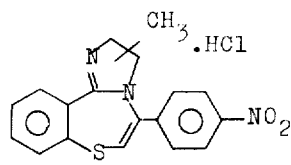

38.4 parts of benzothietane-2-spiro-2'-[4'-(5')-methylimidazolidine] is reacted in 400 parts of glycol monomethyl ether with 40 parts of p-nitrophenacyl chloride. The reaction mixture is stirred for 3 hours at 110° to 120°C, concentrated, cooled, has ethyl acetate added to it and is suction filtered. The yield is 42 parts, i.e., 56% of theory, and the melting point is 291° to 292°C.

What is claimed is:

1. A benzo-(f)-1,4-thiazepine of the formula

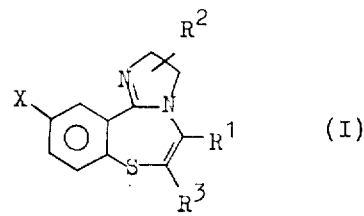

or a pharmacologically compatible acid addition salt thereof in which X is hydrogen, chloro, bromo or lower alkyl of one to seven carbon atoms, $R^1$ is lower alkyl of one to four carbon atoms, phenyl, naphthyl or said phenyl and naphthyl which are mono- or di-substituted by halogen, hydroxy, nitro, methoxy, acetylamino or alkyl of 1 to 4 carbon atoms, and $R^2$ and $R^3$ are each hydrogen or lower alkyl of one to four carbon atoms.

2. A compound as claimed in claim 1 in which X is hydrogen, chloro, bromo or alkyl of one to three carbon atoms.

3. A compound as claimed in claim 1 where $R^1$ is phenyl, naphthyl or said phenyl and naphthyl which are mono- or disubstituted by fluoro, chloro, bromo, iodo or alkyl of one to four carbon atoms or which are monosubstituted by hydroxy, nitro, methoxy or acetylamino.

4. A compound as claimed in claim 1 where $R^1$ is alkyl of one to four carbon atoms.

5. A compound as claimed in claim 1 where $R^2$ is hydrogen or alkyl of one to four carbon atoms.

6. A compound as claimed in claim 1 where $R^3$ is hydrogen or methyl.

* * * * *